United States Patent [19]

Siemon

[11] 4,315,305

[45] Feb. 9, 1982

[54] CONTROLLED D-C POWER SUPPLY

[75] Inventor: Edward C. Siemon, Newfield, N.Y.

[73] Assignee: Borg-Warner Corporation, Chicago, Ill.

[21] Appl. No.: 75,307

[22] Filed: Sep. 12, 1979

[51] Int. Cl.³ ........................................... H02P 13/26
[52] U.S. Cl. ..................................... 363/88; 318/809
[58] Field of Search ................. 363/37, 48, 79, 85–88; 323/22 SC, 237; 318/722, 803, 809; 307/252 P

[56] References Cited

U.S. PATENT DOCUMENTS

| | | | |
|---|---|---|---|
| 3,320,512 | 5/1967 | Kruger | 363/88 |
| 3,443,120 | 5/1969 | Thiele | 323/22 SC |
| 3,518,527 | 6/1970 | Russell | 363/88 |
| 3,783,367 | 1/1974 | Yamamoto et al. | 323/22 SC |

*Primary Examiner*—William H. Beha, Jr.
*Attorney, Agent, or Firm*—James E. Tracy

[57] ABSTRACT

By controlling the phase angle at which conduction occurs in the SCR's in an SCR rectifier bridge, a d-c voltage of adjustable magnitude may be produced from a-c line voltage applied to the bridge. The specific angle at which the SCR's are fired into conduction during each half cycle of the a-c line voltage is determined by comparing a ramp-shaped pulse, produced from the line voltage during each half cycle, with an error signal which varies as a function of the difference between the desired d-c magnitude and the actual amplitude of the d-c voltage. The d-c power supply is made immune to line voltage variations by regulating the ramp-shaped pulses so that they always have the same pulse width regardless of line voltage amplitude, thereby facilitating precise control over the d-c magnitude.

3 Claims, 2 Drawing Figures

4,315,305

CONTROLLED D-C POWER SUPPLY

BACKGROUND OF THE INVENTION

This invention relates to a controlled d-c power supply for producing d-c voltage, at a selected desired amplitude level, from applied a-c line voltage, while at the same time protecting the d-c power supply against undesired line voltage fluctuations that may otherwise preclude accurate control over the d-c amplitude.

A well-known arrangement for developing an adjustable amplitude d-c voltage from a-c line voltage comprises an SCR rectifier bridge having a plurality of SCR's whose conduction angles are controlled in order to maintain a desired d-c magnitude. The greater the phase angle or time delay between the start of a half cycle of the a-c line voltage and the firing of the SCR's into conduction, the less the conduction angle and the less alternating current that will be rectified, thereby providing less d-c voltage across the output of the rectifier bridge. Depending on the load circuits to be driven by the bridge, it may or may not be followed by a low-pass filter (usually a series choke and a shunt capacitor) to eliminate the ripple component and smooth out the d-c voltage. For example, if the d-c voltage drives a d-c motor, it need not be filtered. On the other hand, filtering is preferred when the d-c voltage energizes an inverter.

Triggering the SCR's into conduction is accomplished by gating pulses applied to their gates, and the timing of these gating pulses may be determined by comparing, during each half cycle of the a-c line voltage, a ramp-shaped pulse with an error voltage representing the difference between the actual and desired d-c magnitudes. The ramp-shaped pulses may be developed from the a-c line voltage, but unfortunately line voltage fluctuations deleteriously affect those pulses (varying their widths) and cause improper timing of the gating pulses with resultant erroneous operation of the SCR bridge. Hence, the reliability and performance of this prior d-c power system suffers when the a-c line voltage deviates from its normal amplitude, as a consequence of which the d-c voltage cannot be regulated and held at a desired amplitude level.

The present invention overcomes this problem and provides an improved controlled d-c power supply which is immune to power line voltage variations and is highly efficient and reliable even in the presence of widely fluctuating line voltage.

SUMMARY OF THE INVENTION

The controlled d-c power supply of the invention rectifies applied a-c line voltage to develop therefrom d-c voltage of a desired magnitude, the a-c line voltage being subject to undesired amplitude variations. The power supply comprises an SCR rectifier bridge, having at least two SCR's, for rectifying the a-c line voltage to produce d-c voltage of a magnitude determined by the conduction angle of the SCR's during each half cycle of the a-c line voltage. A pulse generating means, which responds to the a-c line voltage, develops a ramp-shaped pulse during each half cycle of the a-c line voltage. Control means are provided for utilizing the ramp-shaped pulses to trigger the SCR's into conduction at a desired phase angle, following the beginning of each half cycle of the a-c line voltage, thereby to control the conduction angle in order to establish the d-c voltage at a selected desired amplitude level.

Finally, regulating means, which are included in the pulse generating means, are provided for maintaining a constant pulse width for the ramp-shaped pulses despite wide variations in the a-c line voltage, thereby rendering the control means immune to line voltage fluctuations.

DESCRIPTION OF THE DRAWINGS

The features of the invention which are believed to be novel are set forth with particularity in the appended claims. The invention, together with further advantages and features thereof, may best be understood, however, by reference to the following description in conjunction with the accompanying drawings in which:

DESCRIPTION OF THE ILLUSTRATED EMBODIMENT

Figure 1:
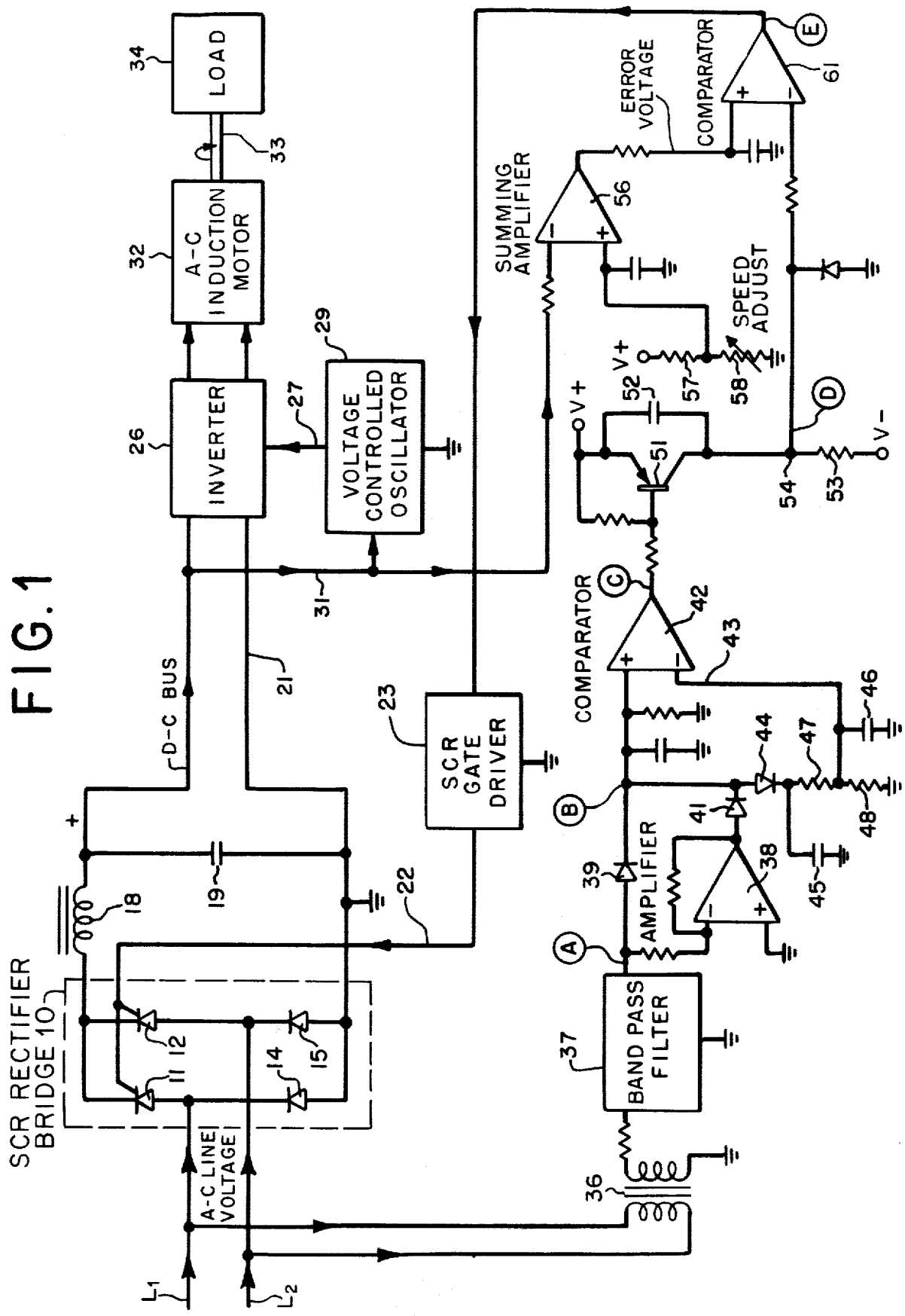
FIG. 1 schematically illustrates a controlled d-c power supply, constructed in accordance with the present invention, and the manner in which that power supply may energize an inverter-driven induction motor.

Line conductors $L_1$ and $L_2$ provide a conventional source of single-phase a-c line voltage varying in sinusoidal fashion at a commutating frequency of 60 hertz and having a normal amplitude of, for example, 120 volts. The magnitude of the a-c line voltage may take any appropriate value depending on the characteristics of the load to be energized. SCR rectifier bridge 10 is of well-known construction, having a pair of silicon controlled rectifiers or SCR's 11 and 12 and a pair of diodes 14 and 15 connected in a bridge configuration. Assuming that SCR's 11 and 12 are gated on, and thus conductive, for at least some portion of each half cycle of the line voltage, during those half cycles of one polarity when line conductor $L_1$ is positive relative to line conductor $L_2$ current will flow in the direction from line $L_1$ through SCR 11, filter choke 18, filter capacitor 19 and the load circuit in shunt therewith, and diode 15 to line $L_2$. During the opposite polarity half cycles when line $L_2$ is positive with respect to line $L_1$ current flows in the direction from line $L_2$ through SCR 12, choke 18, capacitor 19 and the shunting load circuit, and diode 14 to line $L_1$. A positive-polarity d-c voltage will therefore appear on the d-c bus with respect to line 21 which is connected to a ground plane of reference potential or circuit common, zero volts in the illustrated embodiment. Of course, the amplitude of the d-c voltage will depend on the conduction angle of the SCR's during each half cycle, namely the time duration of the portion of each half cycle that the SCR's are gated into conduction, and this in turn will be determined by the timing of the gate current pulses received over line 22 from SCR gate driver 23.

Inverter 26 responds to the d-c voltage and produces therefrom an a-c voltage of a magnitude directly proportional to the amplitude of the d-c voltage. The frequency of the inverter output voltage is established by the pulse repetition frequency of the timing or gating pulses received over line 27 from voltage controlled oscillator 29, which in turn operates in response to the d-c bus voltage received over line 31. The frequency of the oscillator is determined by the d-c voltage and varies directly therewith, thereby maintaining substantially constant the ratio of amplitude to frequency of the a-c voltage developed by inverter 26. The output of the inverter couples to a-c induction motor 32 and effects rotation thereof at a speed determined by and directly proportional to the inverter frequency. The motor rotates shaft 33 to drive some mechanical load 34. By maintaining a fixed ratio of the amplitude of the inverter output voltage relative to its frequency, motor 32 will have a constant torque output capability regardless of motor speed.

Figure 2:
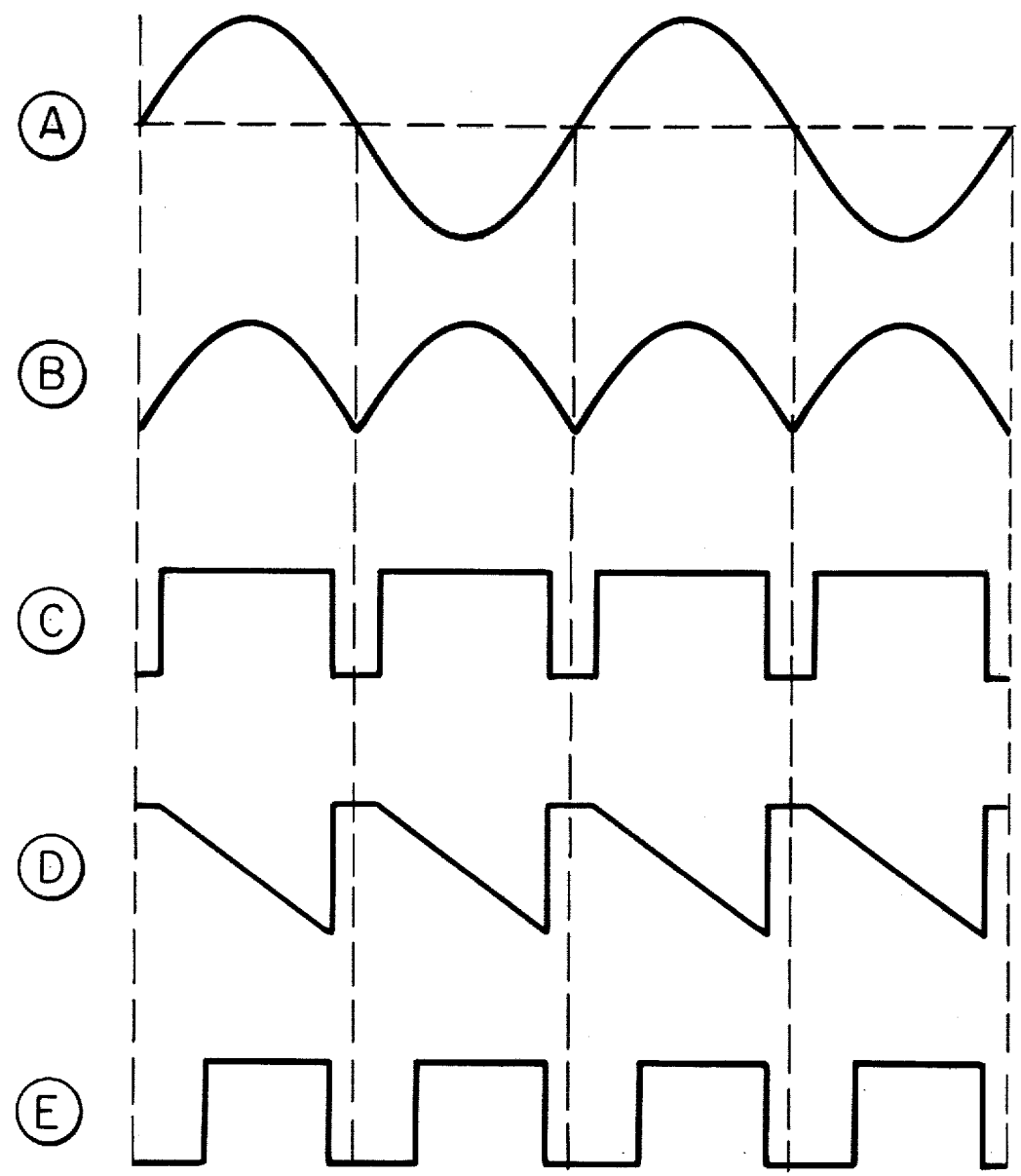
FIG. 2 depicts various voltage signal waveforms that will be helpful in understanding the operation of the d-c power supply. The voltage waveforms are identified by encircled letter designations and the points in the power supply where these various voltages appear are indicated by corresponding encircled letters.

Turning now to the invention, the a-c power line voltage is isolated and stepped down by transformer 36 to provide a reduced amplitude replica of the line voltage for application to band pass filter 37 which is tuned to the fundamental commutating frequency (60 hertz in the illustrated embodiment) of the line voltage. The band pass filter introduces no phase shift to the fundamental but attenuates both high and low frequencies. The output voltage of filter 37 will thus be a reduced amplitude replica of the line voltage fundamental frequency appearing across line conductors $L_1$ and $L_2$ and will be exactly in phase therewith. A low pass filter to attenuate high frequency noise would be unacceptable since it would cause a phase shift in the power line voltage fundamental, as a consequence of which the operation of the invention would be adversely affected. The alternating voltage produced at the output of filter 37 and having a frequency of 60 hertz is therefore as shown by the waveform A in FIG. 2, the instantaneous amplitude of which varies in sinusoidal manner.

Integrated circuit amplifier 38 phase inverts the sinusoidal voltage of waveform A, without introducing any amplification, and diodes 39 and 41 constitute a full-wave rectifier circuit for rectifying the voltages at the outputs of filter 37 and amplifier 38 to provide, at the junction of those two diodes, the full-wave rectified waveform B for application to the non-inverting or (+) input of integrated circuit amplifier 42 which functions as a comparator. Applied to the amplifier's inverting or (−) input over line 43 is a d-c reference voltage at an amplitude level slightly positive relative to the lowest instantaneous amplitude of waveform B, which occurs at the beginning and end of each half cycle when the a-c line voltage crosses its zero axis. With such a relationship of the input voltages to comparator 42, the output voltage of the comparator will be established at a relatively high level when the voltage at the (+) input is greater than (or positive relative to) that at the (−) input and at a relatively low level when the (+) input voltage is less than (or negative relative to) the voltage at the (−) input. Hence, the comparator's output voltage (waveform C) will abruptly switch from a low to a high amplitude level immediately after the a-c line voltage crosses its zero axis and begins a new half cycle and then abruptly switches back to its low level just before the line voltage completes that half cycle. Each of the positive-going pulse components in the rectangular-shaped waveform C will therefore extend throughout, and have a pulse width equal to, substantially an entire half cycle of the a-c line voltage. The leading edge of each positive-going pulse component immediately follows the beginning of a half cycle and its trailing edge occurs immediately before the completion of the half cycle.

Since the voltage applied to the (+) input of comparator 42 is derived from the line voltage, its amplitude will change anytime the line voltage varies. In the absence of the invention, the line voltage variations will cause the comparator to switch output levels at the wrong times, resulting in different pulse widths for the positive-going pulse components of waveform C. As will be appreciated, accurate and reliable performance of the d-c power supply requires that those pulse components have a constant pulse width.

This is achieved in accordance with the invention by providing an adaptive d-c reference voltage for the (−) input of comparator 42. To explain, diode 44, capacitors 45 and 46 and resistors 47 and 48 form a rectifier-filter circuit for converting the full-wave rectified, reduced-amplitude line voltage of waveform B to a d-c reference voltage, on line 43, having a magnitude which is directly proportional to the amplitude of the a-c line voltage. With such an adaptive d-c reference voltage at the (−) input of comparator 42, anytime the amplitude of the voltage of waveform B changes (due to a line voltage variation) the d-c reference voltage will change in the same sense or direction. In other words, both of the voltages applied to the inputs of comparator 42 are directly proportional to the line voltage amplitude. When the line voltage decreases, for example, the waveform B voltage at the comparator's (+) input and the adaptive d-c voltage at the (−) input will also drop. The comparator will therefore switch at the same two times in each half cycle, causing each positive-going pulse component of waveform C to have the same identical width regardless of the line voltage magnitude.

Each of the pulse components of waveform C is converted to a ramp-shaped pulse (waveform D) of the same width by a pulse-shaping circuit comprising PNP transistor 51 and its associated circuit components. More specifically, the rectangular-shaped voltage signal of waveform C is applied to the base of transistor 51 to drive the transistor alternately between saturation and cut-off, the positive-going pulse components cutting the transistor off while the negative-going pulse components drive the transistor into saturation, rendering it conductive such that a very low impedance will exist between the emitter and collector. When transistor 51 is turned off, capacitor 52 effectively charges in a downward direction (looking at the lower side of the capacitor) through resistor 53 toward the voltage source V−, which may for example be −15 volts d-c. Hence, during each positive pulse of waveform C the voltage at circuit junction 54 will decrease linearly and form a ramp as shown by waveform D. At the end of each positive pulse, transistor 51 is driven into saturation by a negative-going pulse, whereupon capacitor 52 discharges instantly through the emitter-collector conduction path to terminate the ramp. The voltage at circuit junction 54 therefore abruptly changes to V+ (or +15 volts d-c if V− is −15 volts d-c) since the emitter and collector of the transistor will now be effectively tied together. As shown in waveform D, the voltage at circuit junction 54 remains at V+ during each negative pulse of waveform C.

It will now be appreciated that by always maintaining a fixed pulse width for the positive-going pulses of waveform C, the width of each of the ramp-shaped pulses of waveform D will be constant even in the presence of wide variations in the a-c line voltage across line conductors $L_1$ and $L_2$.

The ramp-shaped pulses of waveform D are utilized to control the operation of SCR's 11 and 12 in order to establish the d-c voltage, produced by SCR rectifier bridge 10, at a selected desired amplitude level. To elucidate, the d-c voltage from bridge 10 is applied via the d-c bus and line 31 to the inverting or (−) input of integrated circuit amplifier 56 which serves as a summing amplifier, while a d-c reference voltage, provided at the junction of fixed resistor 57 and adjustable resistor 58, is applied to the amplifier's non-inverting or (+) input. As will be made apparent, the magnitude of the d-c voltage on the d-c bus, and consequently the amplitude and frequency of the inverter output voltage, will be determined by the setting of adjustable resistor 58. Hence, that resistor will constitute a speed adjust control for motor 32, and is so labelled in the drawing. In effect, the voltage at the (+) input of summing amplifier 56 is added, while the (−) input voltage is subtracted. As a result, the output of amplifier 56 provides an error voltage which varies as a function of the difference between the desired d-c magnitude (represented by the (+) input voltage) and the actual magnitude of the d-c voltage (represented by the (−) input voltage).

Integrated circuit amplifier 61, operating as a comparator, receives the error voltage on its non-inverting or (+) input and the ramp-shaped waveform D on its inverting or (−) input. The amplitude level of the error voltage, regardless of where it is at any given time, will always fall somewhere within the amplitude range covered by the ramp-shaped pulses. At the beginning of a half cycle of the line voltage when the ramp voltage is just starting to decrease, the voltage at the (−) input of comparator 61 will be greater than (or positive with respect to) the voltage at the comparator's (+) input, resulting in a relatively low level output voltage as shown by waveform E. However, at some point during each half cycle the ramp voltage will drop below the error voltage and comparator 61 will abruptly switch from a low level to a high level output voltage where it will remain until the end of the ramp, whereupon the comparator returns to its low level output voltage. For illustrative purposes, waveform E has been drawn to indicate the operating conditions when the error voltage is of an appropriate magnitude to delay the start of a positive-going pulse until about 50° into the 180° half cycle. The signal of wavefrom E controls the operation of SCR gate driver 23 which in turn will produce properly timed gate current pulses for firing SCR's 11 and 12 into conduction. The gating pulses will be generated in response to the leading edges of the positive-going pulses of waveform E.

Depending on the setting of speed adjust resistor 58, the timing of the gating pulses on line 22 will automatically be adjusted so that the d-c voltage produced by bridge 10 will have the required magnitude to drive motor 32 at the selected desired speed. If the d-c magnitude tends to increase, for example, from the required level, the error voltage decreases and causes the positive pulses of waveform E to start at a later time during each half cycle, thereby triggering the SCR's into conduction at a greater phase angle to lower the d-c voltage on the d-c bus until the correct amplitude level is re-established. Assuming that a higher motor speed is desired, speed adjust resistor 58 will be adjusted so that the error voltage will increase, thereby advancing the leading edges of the positive pulses of waveform E to increase the conduction intervals of the SCR's sufficiently to bring the d-c bus voltage up to the level necessary to drive motor 32 at the new desired speed.

The invention provides, therefore, a novel arrangement for controlling the operation of a d-c power supply so that a desired d-c amplitude will always be maintained regardless of power line voltage fluctuations. A salient feature resides in providing an adaptive d-c reference voltage at the (−) input of comparator 42 to regulate its operation so that the ramp-shaped pulses produced at circuit junction 54 will always have a constant pulse width despite wide variations in the a-c line voltage. In this way, the control system for the d-c power supply is rendered immune to line voltage fluctuations, thereby enhancing its reliability and performance to ensure precise control over the magnitude of the d-c voltage developed by the power supply.

While a particular embodiment of the invention has been shown and described, modifications may be made, and it is intended in the appended claims to cover all such modifications as may fall within the true spirit and scope of the invention.

I claim:

1. A controlled d-c power supply for rectifying applied a-c line voltage to develop therefrom d-c voltage of a desired magnitude, the a-c line voltage being subject to undesired amplitude variations, comprising:
    an SCR rectifier bridge, having at least two SCR's, for rectifying the a-c line voltage to produce d-c voltage of a magnitude determined by the conduction angle of the SCR's during each half cycle of the a-c line voltage;
    pulse generating means, responsive to the a-c line voltage, for developing a ramp-shaped pulse during each half cycle of the a-c line voltage;
    control means for utilizing said ramp-shaped pulses to trigger said SCR's into conduction at a desired phase angle, following the beginning of each half cycle of the a-c line voltage, thereby to control the conduction angle in order to establish the d-c voltage at a selected desired amplitude level;
    and regulating means, included in said pulse generating means, for maintaining a constant pulse width for said ramp-shaped pulses despite wide variations in the a-c line voltage, thereby rendering said control means immune to line voltage fluctuations,
    said pulse generating means including a band pass filter for attenuating, in the a-c line voltage, frequencies above and below the fundamental commutating frequency, while at the same time introducing no phase shift to that fundamental frequency.

2. A controlled d-c power supply for rectifying applied a-c line voltage to develop therefrom d-c voltage of a desired magnitude, the a-c line voltage being subject to undesired amplitude variations, comprising:
    an SCR rectifier bridge, having at least two SCR's for rectifying the a-c line voltage to produce d-c voltage of a magnitude determined by the conduction angle of the SCR's during each half cycle of the a-c line voltage;
    pulse generating means, responsive to the a-c line voltage, for developing a ramp-shaped pulse during each half cycle of the a-c line voltage;
    control means for utilizing said ramp-shaped pulses to trigger said SCR's into conduction at a desired phase angle, following the beginning of each half cycle of the a-c line voltage, thereby to control the conduction angle in order to establish the d-c voltage at a selected desired amplitude level;

and regulating means, included in said pulse generating means, for maintaining a constant pulse width for said ramp-shaped pulses despite wide variations in the a-c line voltage, thereby rendering said control means immune to line voltage fluctuations, said pulse generating means including comparison means for comparing full-wave rectified, reduced-amplitude line voltage with an adaptive d-c reference voltage, the amplitude of which varies directly with changes in line voltage, to produce a rectangular shaped pulse component of constant width during each half cycle of the a-c line voltage, and means for developing said ramp-shaped pulses from the pulse components.

3. A controlled d-c power supply for rectifying applied a-c line voltage to develop therefrom d-c voltage of a desired magnitude, the a-c line voltage being subject to undesired amplitude variations, comprising:

an SCR rectifier bridge, having at least two SCR's, for rectifying the a-c line voltage to produce d-c voltage of a magnitude determined by the conduction angle of the SCR's during each half cycle of the a-c line voltage;

pulse generating means, responsive to the a-c line voltage, for developing a ramp-shaped pulse during each half cycle of the a-c line voltage;

control means for utilizing said ramp-shaped pulses to trigger said SCR's into conduction at a desired phase angle, following the beginning of each half cycle of the a-c line voltage, thereby to control the conduction angle in order to establish the d-c voltage at a selected desired amplitude level;

and regulating means, included in said pulse generating means, for maintaining a constant pulse width for said ramp-shaped pulses despite wide variations in the a-c line voltage, thereby rendering said control means immune to line voltage fluctuations, said pulse generating means including a full-wave rectifier circuit for providing full-wave rectified, reduced-amplitude line voltage; a rectifier-filter circuit for converting the rectified line voltage to a d-c reference voltage having a magnitude which is directly proportional to the amplitude of the a-c line voltage; a comparator for comparing the full-wave rectified, reduced-amplitude line voltage with said d-c reference voltage to produce, during each half cycle, a constant width pulse component having its leading edge immediately following the beginning of the half cycle and its trailing edge immediately before the completion of the half cycle; and means for developing said ramp-shaped pulses from the pulse components, each of the ramp-shaped pulses occurring in time coincidence with and having the same width as a pulse component.

* * * * *